March 27, 1956

J. F. JOY

2,739,722

SHUTTLE-LOADER

Filed July 12, 1951

Inventor:
Joseph F. Joy.
by Charles F. Osgood,
Attorney.

March 27, 1956 J. F. JOY 2,739,722
SHUTTLE-LOADER
Filed July 12, 1951 8 Sheets-Sheet 2

Inventor:
Joseph F. Joy
by Charles F. Osgood,
Attorney

March 27, 1956     J. F. JOY     2,739,722
SHUTTLE-LOADER
Filed July 12, 1951     8 Sheets-Sheet 4

Inventor:
Joseph F. Joy.
by Charles F. Osgood,
Attorney.

Inventor:
Joseph F. Joy.
by Charles F. Osgood,
Attorney.

March 27, 1956  J. F. JOY  2,739,722
SHUTTLE-LOADER
Filed July 12, 1951  8 Sheets-Sheet 7

Inventor:
Joseph F. Joy.
by Charles F. Osgood,
Attorney.

ated Mar. 27, 1956

2,739,722

SHUTTLE-LOADER

Joseph F. Joy, Pittsburgh, Pa., assignor to Joy Manufacturing Company, Pittsburgh, Pa., a corporation of Pennsylvania Application July 12, 1951, Serial No. 236,292

29 Claims. (Cl. 214—518)

This invention relates to material haulage vehicles and more particularly to a material haulage vehicle of the type known as a shuttle-loader having a self-loading mechanism for loading loose material to be hauled into the material-receiving-compartment of the vehicle body.

Hauling vehicles, of known types, such as those commonly known as shuttle cars, have been widely employed for loading coal and ore in coal and ore mining and for hauling rock in tunnel driving, and it is the usual practice to load such shuttle cars by means of a separate mobile loading machine which may serve several shuttle cars during the loading and hauling operations. The present invention contemplates improvements over such known types of haulage vehicles in that a shuttle car is provided having self-loading mechanism whereby the car may effect its loading operation, thereby eliminating a need for a separate mobile loading machine as well as the need for a separate loading machine operator. The machine of the present invention is known as a shuttle-loader and not only embodies a large material-receiving-compartment or hopper and self-discharging mechanism for the load, but also embodies a self-loading mechanism of a relatively simple yet highly effective design. The machine of the present invention is not only of relatively large capacity and self-loading but is also relatively simple and rugged in design and relatively flexible in operation, well adapted for its intended purpose.

An object of the present invention is to provide an improved material haulage vehicle. Another object is to provide an improved haulage vehicle of the kind commonly known as a shuttle car having self-loading mechanism. Another object is to provide an improved shuttle-loader. A further object is to provide an improved shuttle car of the self-loading type which is completely hydraulically driven. Yet another object is to provide an improved conveying means or feeder for a shuttle car whereby the car hopper may be completely filled with material and the loaded car may be rapidly unloaded. A still further object is to provide an improved shuttle car having a relatively large material-receiving-compartment or hopper and provided with an end-gate whereby the load carrying capacity of the car is greatly increased and the possibility of spillage of material during travel of the car is substantially reduced. A further object is to provide an improved reciprocating conveyor or feeder extending along the bottom and the full width of the hopper whereby the latter may be loaded with material to its full height. Another object is to provide an improved shuttle-loader having improved self-loading mechanism whereby the car may mechanically load itself. Still another object is to provide an improved haulage vehicle having the various devices thereof hydraulically operated and provided with improved control means whereby extreme flexibility in operation is attained. A still further object is to provide an improved shuttle-loader having a novel combination and arrangement of parts. These and other objects and advantages of the invention will, however, hereinafter more fully appear.

In the accompanying drawings there is shown for purposes of illustration one form which the invention may assume in practice.

In these drawings:

Figs. 4a and 4b, considered together, constitute an enlarged central longitudinal section through the shuttle-loader, the view taken on line 4—4 of Fig. 1.

Fig. 12 is a plan view, on a reduced scale, illustrating the different operating positions of the loading bucket.

Fig. 21 is a diagrammatic view illustrating the hydraulic fluid system.

In this illustrative embodiment of the invention, as shown in the drawings, the improved shuttle-loader is generally designated 1 and generally comprises a mobile body 2 supported by propelling and steering means herein front traction wheels 3 and rear steering wheels 4, and the vehicle body has a material-receiving-compartment or hopper 5 extending lengthwise thereof and provided with a rear end-gate 6. Mounted at the forward end of the body is a self-loading mechanism, generally designated 7, including a bucket 8 for gathering loose material such as loose coal or ore, and for moving the material so gathered into the hopper. Extending along the length and across the width of the hopper bottom is a reciprocatory conveyor or feeder, generally designated 9, for effecting loading of the hopper and for providing a self-discharging mechanism for the hopper. Arranged at one side of the forward portion of the machine body is a recess 10 providing an operator's station. Arranged between the front and rear wheels at this same side of the body is a cable reel mechanism 11 on which a conductor cable is wound, for supplying electric power to an electric driving motor 12, the latter arranged between the front and rear wheels at the opposite side of the body, and this motor effects drive of a conventional pumping means 13 for supplying liquid under pressure to the various hydraulically operated devices of the machine.

Figure 6:
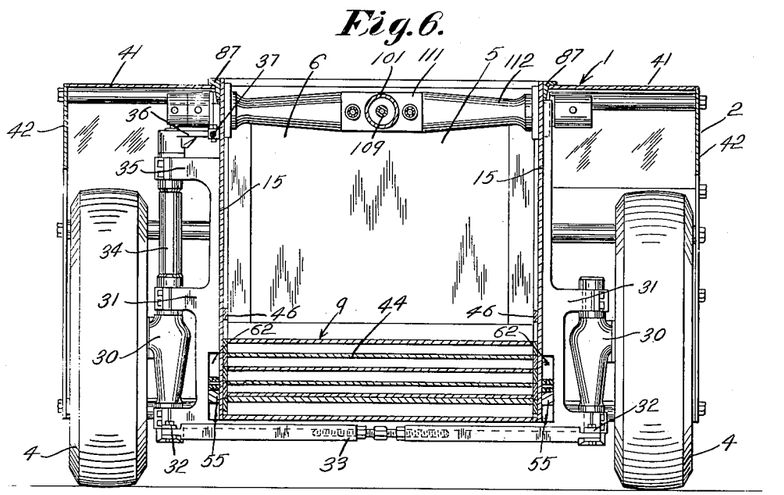
Fig. 6 is an enlarged cross sectional view taken on line 6—6 of Fig. 2.
Figure 7:
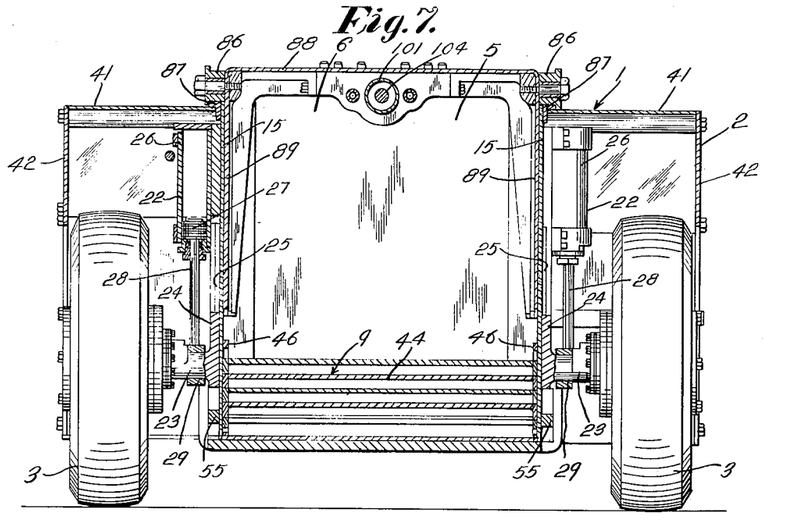
Fig. 7 is an enlarged cross sectional view taken on line 7—7 of Fig. 2.

The vehicle body is of a generally rectangular, low height design especially adapted for use in underground mines or tunnels, and is desirably of a fabricated, welded plate construction, and the compartment or hopper 5 extends lengthwise of the body and has parallel vertical sidewalls provided by vertical side plates 15. The end-gate 6 closes the rear end of the hopper and the outer sides of the vehicle body at the discharge end of the vehicle are tapered or relatively inclined at 16, and arranged at the front end of the body is a projecting apron 17 extending the full width of the vehicle and provided with a forward transverse penetrating nose 18. The front traction wheels 3 are desirably driven by conventional variable speed-reversible hydraulic motors 19 desirably of the reciprocating piston, wabble plate type built compactly within the wheel hubs, and these motors may be similar to that disclosed in my Patent No. 2,353,730, granted July 18, 1944. The reel 20 of the cable reel mechanism is driven by a similar variable speed hydraulic motor 21. The forward end of the vehicle body is adjustably mounted on the front traction wheels 3 by means of upright hydraulic jacks 22 whereby the apron 17 may be raised and lowered as desired and may be rigidly held in adjusted position. The axles 23 for these traction wheels are secured to suitable brackets 24 mounted for vertical sliding adjustment along vertical guideways 25 carried at the outer sides of the vertical side plates 15 of the hopper, as shown in Fig. 7. Upright hydraulic cylinders 26 secured to the vertical side plates contain reciprocable pistons 27 having downwardly extending piston rods 28 connected at 29 to the wheel axles 23. The pistons may be moved in their respective cylinders to effect tilting of the machine body about a transverse axis to lower the apron near to or into contact within the ground or floor surface and to raise the apron, as indicated in dotted lines in Fig. 3. Since the axles 23 are separately mounted and guided and are connected to separate pistons the need for a transverse rocking axle at this point is eliminated thereby substantially reducing the space requirements, rendering it possible to locate the bottom of the vehicle body in a relatively low position with respect to the wheels thus increasing the capacity of the hopper for a vehicle of given height. The rear steering wheels 4 have their axles 30 turnable horizontally about upright axes, as shown in Fig. 6, on suitable brackets 31 secured to the outer sides of the hopper side plates 15. Secured to the lower portions of these swivelled axles are levers 32 connected by an adjustable cross drag-link 33 so that the axles swing in unison. The left hand axle, as viewed in Fig. 6, has a vertical shaft 34 journaled in suitable bearing bracket portions 35 and provided with a top lever arm 36. Pivotally connected to this lever arm is an operating rod 37 (see also Fig. 3) rigidly connected through a rectangular, open-centered sliding frame 37a to the piston rods of a reciprocable piston 38 (Fig. 20) contained in a hydraulic steering cylinder 39 secured, as by welding to the outer side of the adjacent hopper side plate. The valve means for controlling flow of liquid under pressure to and from the steering cylinder 39 will later be described. Thus, the steering wheels may be turned in either direction as desired through the steering connections above described to effect proper steering of the vehicle during traveling.

Figure 4A:
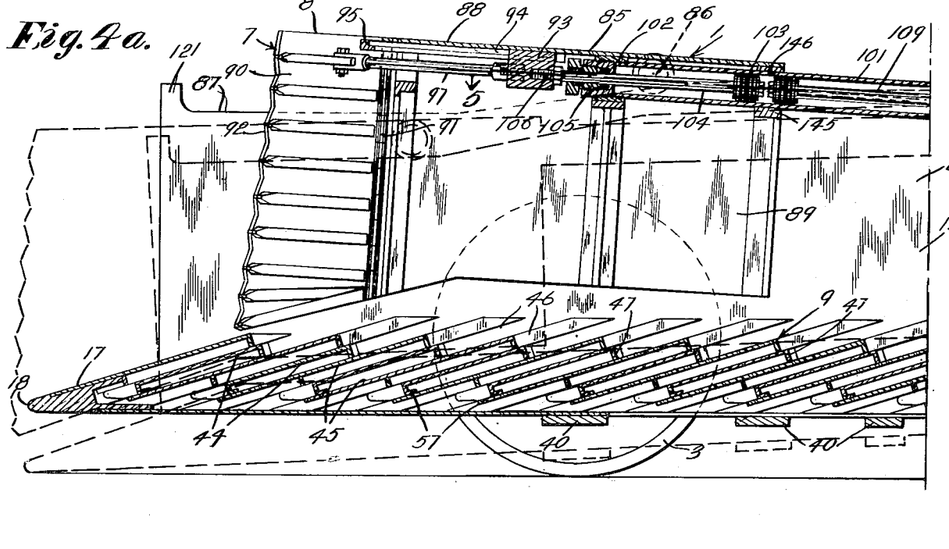

As shown in Figs. 4a, 4b and 7, a series of cross frames or traverse braces 40 underlie the hopper bottom, beneath the conveyor or feeder, and these cross frames or braces are secured to the outer sides of the vertical side plates 15 and certain of these cross frames are integral with the side brackets providing the guideways 25 and the supports for the swivelled axles 30 of the steering wheels. Thus, the sides of the vehicle body are rigidly transversely braced to provide for the necessary rigidity of the frame. Top cover plates 41 and side plates 42 partially house in the wheels and close in the cable reel mechanism, the pumping means and its driving motor.

Figure 2:
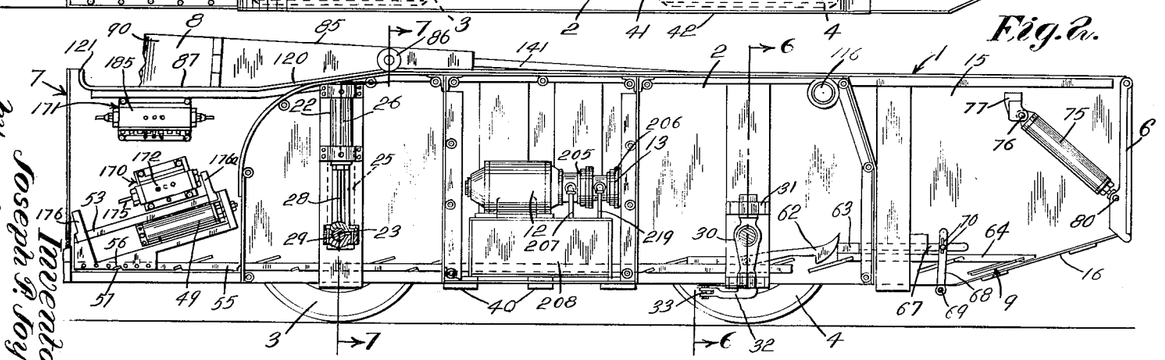
Fig. 2 is a side elevational view of the shuttle-loader shown in Fig. 1, with the near wheels removed and showing parts in section.
Figure 8:
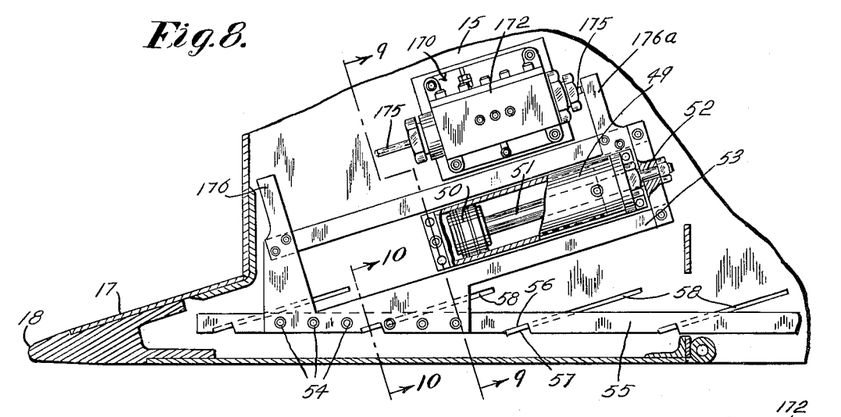
Fig. 8 is an enlarged detail vertical section showing one of the operating cylinders for the hopper-feeder or bottom conveyor.

The reciprocatory conveyor or feeder 9 arranged at the bottom of the hopper is of the reciprocating plate type and comprises a series of rearwardly and upwardly inclined, parallel pusher elements in the form of bars or plates 44 guided for reciprocation in inclined guideways 45 arranged between parallel stationary plates 46 and secured to the inner sides of the vertical side plates 15 of the hopper. These pusher plates have upper pusher surfaces 47 and, as they are rapidly reciprocated, serve to push the material received in the hopper rearwardly and upwardly thereby to fill completely the hopper. A rearward feeder plate portion or section 48 is inactive whenever the end-gate 6 is closed but when this gate is opened, this rearward feeder section is rendered effective and coacts with the other parts of the feeder to effect complete discharge of the hopper-contents from the rear end of the vehicle. The feeder is actuated by a pair of hydraulic cylinders 49, shown in Figs. 3 and 8, arranged at the opposite sides of the forward portion of the vehicle body with their axes inclined in parallelism with the guideways 46 for the pusher plates, as shown in Fig. 2. These cylinders are rigidly secured as by bolts to the vertical side plates 15 and contain reciprocable pistons 50 having piston rods 51 secured at 52 to reciprocating frames 53 of generally rectangular shape and rigidly secured as by screws 54 to the forward portions of longitudinally extending side bars 55 arranged at the outer sides of the vertical plates 15 and connected to the lower portions of the pusher plates. These reciprocable side bars are notched at 56 at their lower edges to receive cross bars 57 secured to the pusher plates and projecting laterally outwardly through suitable side openings 58 in the vertical side plates. Thus, as the pistons 50 reciprocate the pusher bars 43 of the feeder are rapidly reciprocated in their guideways to effect feed. The control valve means for controlling flow of fluid to and from the hydraulic cylinders 49 will later be described.

Figure 3:
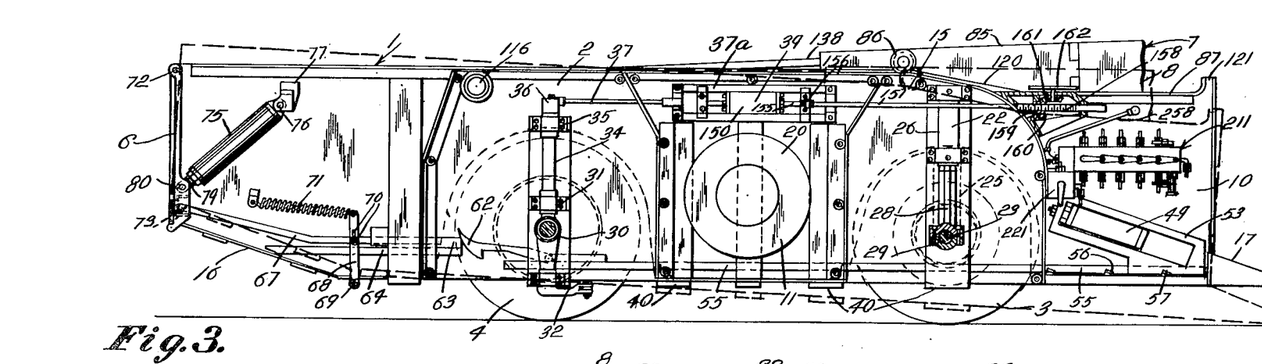
Fig. 3 is a side elevational view similar to Fig. 2, looking toward the opposite side of the machine and likewise with the near wheels removed and parts shown in section.
Figure 11:
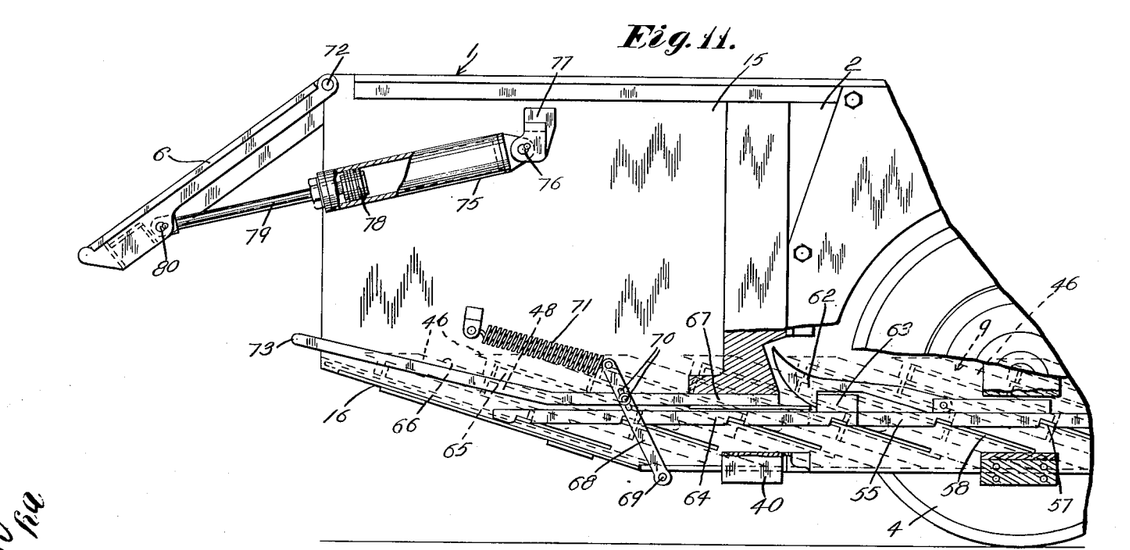
Fig. 11 is a fragmentary side view showing the end-gate in open position and with parts shown in vertical section to illustrate structural details.

The actuating means for the rearward feeder section comprises resilient dogs or latches 62 secured to the rearward portions of the reciprocatory side bars 55, as shown in Figs. 3 and 11, and these latches are engageable with blocks 63 secured to the forward portions of reciprocatory side bars 64 of the rearward feeder section. The side bars 55 are suitably guided for longitudinal movement within the lower portion of the vehicle body as shown in Figs. 2 and 3. Thus, when the side bars 64 are interlocked by the latches with the reciprocatory side bars 55 they reciprocate in unison therewith so that feeder plates 65 of the rearward feeder section are rapidly reciprocated in inclined guideways 66 arranged in parallelism with the guideways 46. When the end-gate 6 is closed, as shown in Fig. 3, a pair of side rods 67 have moved forwardly to fill the spaces rearwardly of the blocks 63 whereby, at this time, the latches 62 merely ride back and forth over the blocks without locking engagement therewith so that the rearward feeder section remains inactive. Lever arms 68 pivoted at 69 at the lower portion of the vehicle body to swing in longitudinal vertical planes are connected by pin and slot connections 70 to the side rods 67, and springs 71 act on the upper ends of the lever arms yieldingly to urge the side rods 67 rearwardly. The end-gate 6 is pivoted at 72 at its upper edge on the rear end of the vehicle body to swing about a horizontal transverse axis and when this gate is swung towards closed position it engages the projecting rear ends 73 of the side rods 67 to move the latter forwardly to the position shown in Fig. 3, thereby to prevent locking engagement of the latches 62 with the rod-blocks 63. When the gate is opened, as shown in Fig. 11, the springs 71 move the side rods 67 rearwardly into a position wherein the latches may lockingly engage the blocks 63, thereby to connect the rear feeder section for reciprocation with the main forward feeder section. A pair of hydraulic cylinders 75, arranged at the opposite sides of the vehicle body, are each pivoted at its upper end at 76 to a suitable bracket 77 secured to the vehicle body, and these cylinders contain reciprocable pistons 78 having piston rods 79 pivotally connected at their outer ends at 80 to the sides of the lower portion of the end-gate 6. Thus, by properly supplying liquid under pressure to the cylinders 75 the pistons 78 may be moved to effect swinging of the gate into either its open or its closed position as desired. The control valve means for the gate cylinders will later be described.

The bucket 3 of the self-loading mechanism 7 for the body compartment is mounted on a longitudinally movable support 85 arranged in the compartment or hopper 5 between the vertical side plates 15 and supported by guides such as rollers 86 adapted to travel along parallel guideways herein desirably in the form of trackways 87 disposed at the upper edges of the vertical side plates 15. This support is of inverted generally U-shape, as shown in Fig. 7, open at its bottom and having a transverse upper portion 88 and vertical side portions 89, the latter being guided by the inner surfaces of the vertical side plates 15 as the supporting rollers travel along the trackways. The bucket 3 has swingable digging and gathering portions or jaws 90 pivoted at 91 on upright axes at the opposite sides of the front portion of the support 85 and the cooperating penetrating or digging edges of these bucket portions are toothed or serrated at 92 to facilitate penetration of the material to be loaded. The bottoms of the bucket jaws are desirably inclined so as to fit closely to the inclined upper surface of the apron when the bucket is advanced with the jaws in open retracted position, as indicated in dotted lines in Fig. 4a. The mechanism for swinging the bucket-portions or jaws about their pivots comprises a reciprocable guide block 93 guided for longitudinal movement in a longitudinal guideway 94 provided by a guide frame 95 secured to the bottom and centrally between the sides of the upper transverse portion 88 of the bucket support 85. This upper guide block is pivotally connected at 96 to a pair of oppositely extending arms or links 97 in turn pivotally connected at their outer ends at 98 to projections 99 integral with the swingable bucket-portions or jaws 90. An elongated, longitudinally extending, reciprocable hydraulic cylinder 101 (Fig. 5) is rigidly secured at 102 to the bucket support 85, midway between the sides of the upper portion of the vehicle body and contained in this cylinder is a reciprocable piston 103 having its piston rod 104 projecting forwardly through the front packed head 105 of the cylinder and rigidly secured at 106 to the guide block 93. Also contained in the cylinder 101 is a stationary piston 108 having its piston rod 109 rigidly secured at 110 to a swivelled block 111 formed integral with a cross member 112 rotatably mounted in bearings 113 supported by bearing brackets 114 rigidly secured to the vertical side plates 15 of the hopper. Threadedly secured at 115 to the bearing supports 114 are outer elements 116 which serve to clamp the bearing supports firmly in position against the vertical side plates. Thus, the block 111 may have a slight rocking movement about a rearwardly located, transverse horizontal axis on the vehicle body. When liquid under pressure is suitably supplied to the cylinder 101 intermediate the pistons 103 and 108 and liquid is trapped in the cylinder in advance of the piston 103 the cylinder 101 may be moved longitudinally to effect movement of the bucket support 85 forwardly along its trackways thereby to move the bucket forwardly within the compartment 5 with respect to the vehicle body. When liquid under pressure is exhausted from the cylinder 101 in advance of the piston 103 and liquid is trapped in the cylinder rearwardly of the piston 108 the piston 103 may be moved forwardly within the cylinder to effect, through the guide block 93 and links 97, swinging of the bucket-portions or jaws 90 outwardly about their pivots relative to the support 85, as shown in dotted lines in Fig. 12. Liquid may then again be trapped in the cylinder 101 in advance of the piston 103, the rear end of the cylinder bore connected to exhaust, and liquid under pressure may be supplied to the cylinder bore rearwardly of the piston 103 to move the cylinder and piston 103 forwardly to thrust the wide open jaws in a forward direction. When liquid is supplied to the cylinder 101 in advance of the piston 103 and trapping of liquid in the cylinder rearwardly of the piston 108 is maintained, the piston 103 may be moved rearwardly to effect swinging of the bucket-portions or jaws 90 inwardly about their pivots to the closed position shown in full lines in Fig. 12. When liquid under pressure is suitably supplied to the bore of the cylinder 101 rearwardly of the piston 108 and liquid is trapped in the cylinder in advance of the piston 103, the cylinder 101 may be moved rearwardly to effect rearward movement of the bucket support 85 thereby to retract the closed bucket to its rearmost position within the compartment 5. Thus, when the jaws 90 of the bucket are swung into their wide open position the bucket support 85 may be moved forwardly to thrust the penetrating edges of the bucket into the material to be loaded and the jaws may thereafter be swung inwardly to gather the material therein, and finally the bucket support 85 may be moved rearwardly to move the material so gathered into the hopper of the vehicle. The rearward portions of the trackways 87 are upwardly and rearwardly inclined at 120 so that as the bucket supporting rollers 86 and the bucket support 85 move rearwardly, the bucket support is elevated slightly so that the lower portion of the bucket will clear the apron 17 as the bucket is retracted, as shown in Fig. 4a. The forward ends of the trackways 87 are formed with upstanding abutments or stops 121 with which the rollers 86 are engageable for limiting the forward travel of the bucket with respect to the vehicle body. As the bucket support moves forwardly from the position shown in Fig. 4a, the rollers move downwardly along the inclined portions 120 of the trackways so that when the rollers engage the abutments 121, the bucket has assumed its foremost lowered position with respect to the apron 17.

Figures 5, 10:
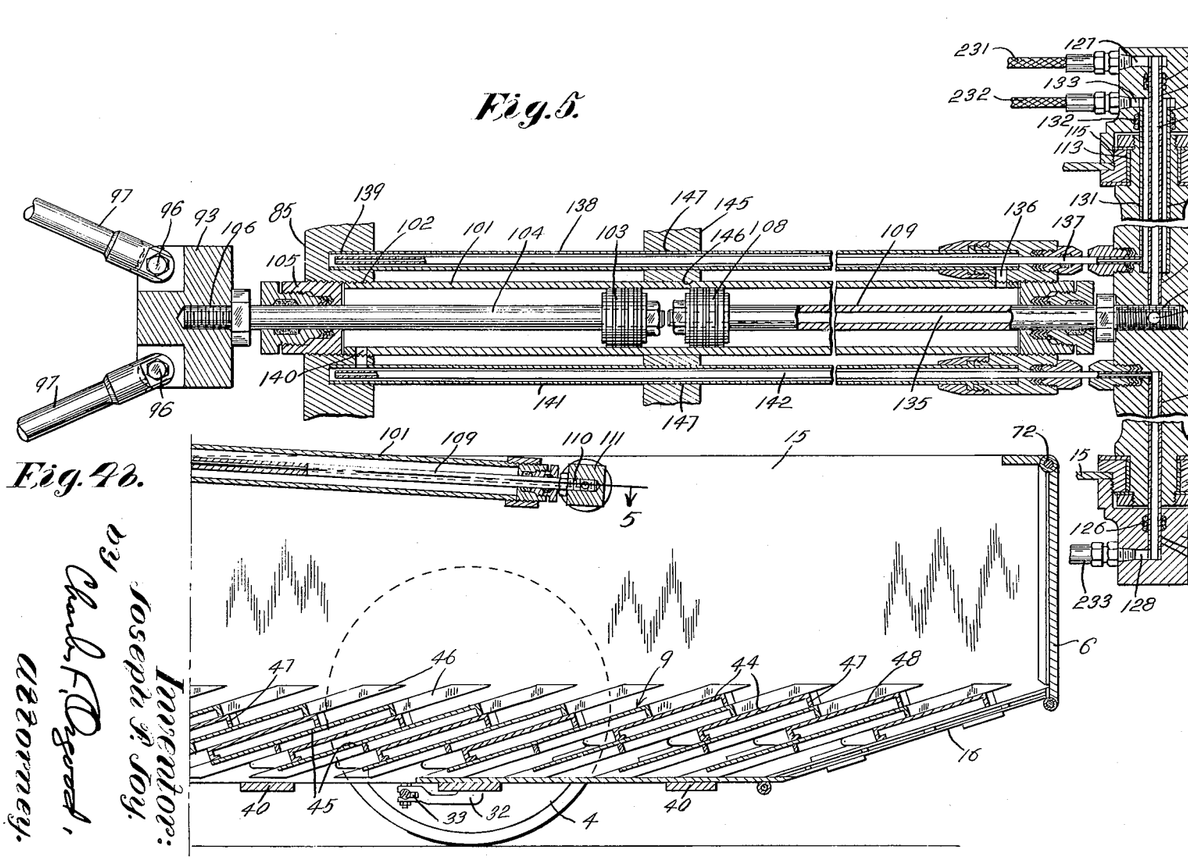
Fig. 5 is an enlarged central longitudinal section taken on line 5—5 of Figs. 4a and 4b.
Figs. 9 and 10 are detail cross sections taken respectively on lines 9—9 and 10—10 of Fig. 8.

Fluid supply and exhaust connections are associated with the transverse member 112 whereby supply and exhaust of liquid are maintained in the different positions of rocking movement of the block 112 as the rollers of the bucket support travel upwardly and downwardly in opposite directions along the inclined positions of the trackways. Secured within axially aligned bores 122 in the outer clamping elements 116 for the bearing supports are coaxial conducting tubes 123 and 124 which extend in opposite directions into aligned bores 125 in the transverse member, as shown in Fig. 5. Suitable packings 126 carried by the clamping elements 116 sealingly engage the exterior peripheries of these tubes to prevent leakage. Liquid flow passages 127 and 128 in the clamping elements 116 respectively, communicate with the remote ends of the aligned liquid conducting tubes 123 and 124. Concentric with and surrounding the tube 123 is a larger liquid conducting tube 129 secured in a bore 130 in one of the clamping elements and extending into a bore 131 in the transverse member 112. A suitable packing 132 carried by the clamping element sealingly engages the exterior periphery of this larger tube to prevent leakage. The tube 123 within the larger tube projects inwardly beyond the inner end of the larger tube and communicates at its inner end with a lateral passage 134 in the rearward end of the piston rod 109. This lateral passage communicates with an axial passage 135 in the piston rod and this axial passage extends forwardly through the forward end of the piston rod and communicates with the cylinder 101 at the forward side of the piston 108 and at the rearward side of the piston 103. A liquid flow passage 136 communicates with the rear end of the cylinder at the rear side of the piston 108 and the larger outer tube 129 is connected through a longitudinally extending tube 137 which is telescopically arranged within a concentric outer tube 138 secured at its forward end at 139 to a portion of the bucket support 85. The passage 136 also communicates with the interior of the tube 138. A liquid flow passage 140 communicates with the front end of the cylinder 101 in advance of the piston 103 and communicates with the interior of an outer tube 141 likewise secured to the bucket support and in which there is telescopically arranged a concentric inner tube 142 communicating with the interior of the tube 124. Thus, irrespective of the axially adjusted position of the cylinder 101 with respect to the transverse member 112 liquid under pressure may flow to and liquid may be discharged from the opposite ends of the cylinder through these telescopically arranged tubes 137, 138 and 141, 142 and the aligned tubes 131 and 124 within the transverse member 112. Also liquid under pressure may be conducted to and be discharged from the cylinder 101 intermediate the pistons 103 and 108 through the axial passage 135 in the piston rod 109 and the concentric tube 123 in the transverse member 112. The bucket support 85 has a rearward portion 145 having a bore 146 through which the intermediate portion of the cylinder 101 extends and this portion 145 has parallel bores 147 at its opposite sides, as shown in Fig. 5, and the outer tubes 138 and 141 of the telescopic fluid flow connections extend through and are guided within these parallel bores. Thus, the cylinder 101 and the outer tubes 138 and 141 are firmly supported at longitudinally spaced points by the bucket support 85. The control valve means for supplying liquid under pressure to and for exhausting liquid from the passages 127, 128 and 133 will later be described.

Figure 20:
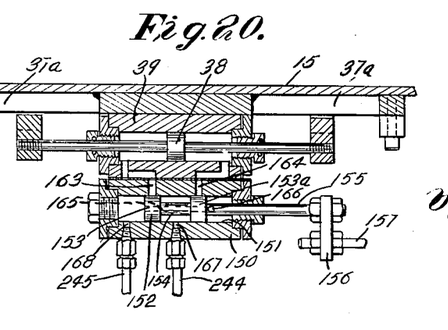
Fig. 20 is an enlarged horizontal section taken through the steering cylinder and its associated control valve.
Figure 24:
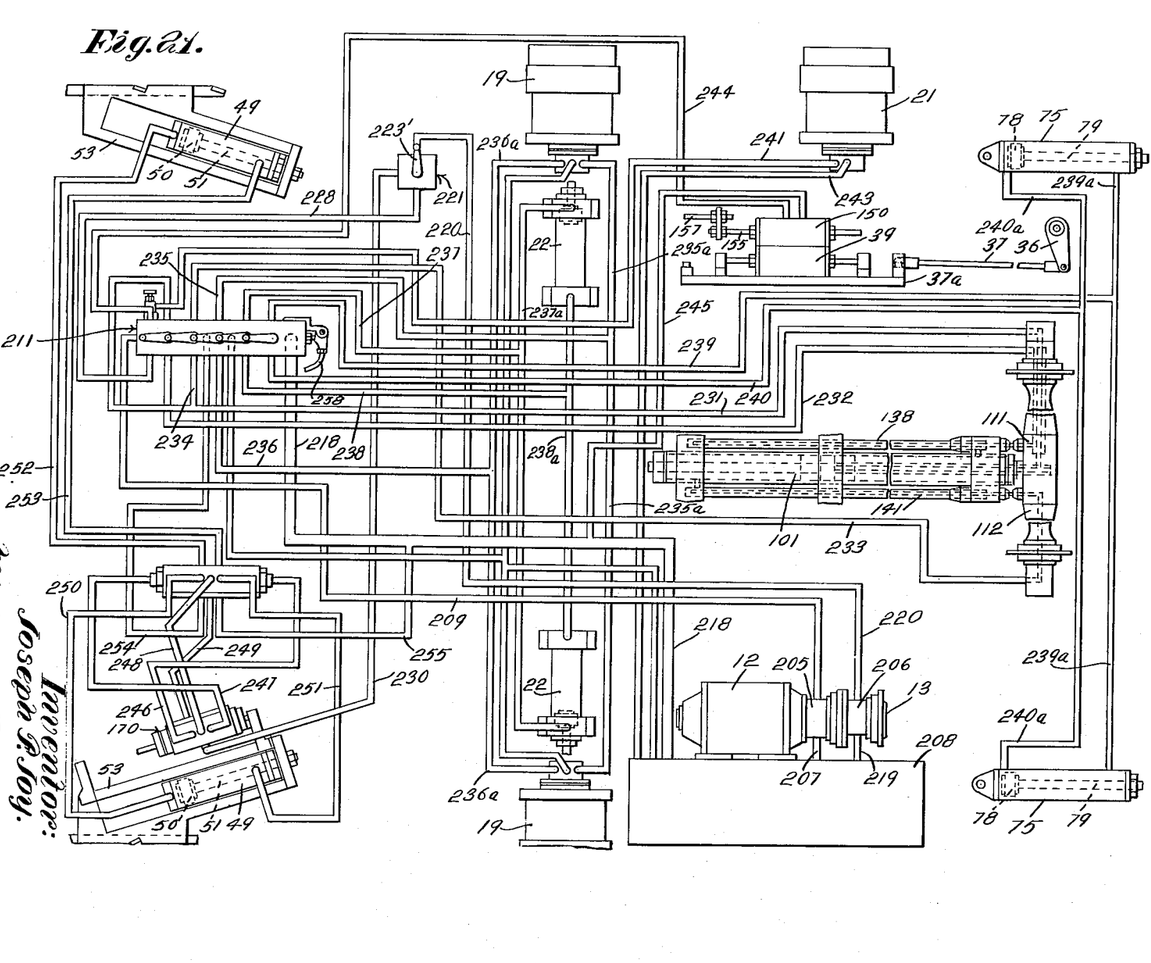

Now referring to the control valve means for the steering cylinder 39, it will be noted that suitably secured to the outer side of this cylinder is a valve casing 150 having a longitudinal bore 151 arranged in parallelism with the cylinder bore, as shown in Fig. 20. A spool type slide valve 152 is slidably mounted within the bore 151 and comprises spaced end spools 153 and 153a separated by a reduced portion 154 to provide an annular groove between the spools. This valve has a projecting stem 155 attached at 156 to a longitudinally extending operating rod 157. The forward portion of this rod is threaded at 158 (Fig. 3) and a rotatable nut 159 engages this threaded rod portion and is suitably journaled within a bracket secured to the adjacent side of the vehicle body. A bevel gear 160 on the nut meshes with a bevel gear 161 secured to a hand wheel 162 conveniently located at the operator's station. The valve-receiving-bore 151 is connected by passages 163 and 164 respectively to the opposite ends of the steering cylinder 39 at the opposite sides of the piston 38. An axial passage 165 in the valve communicates with the rear end of the bore 151 and is connected by a port 166 in the valve stem with the front end of the bore 151. Passages 167 and 168 open through the walls of the valve casing at longitudinally spaced points and respectively communicate with the liquid supply and exhaust. When the valve is in its central position shown in Fig. 20, both passages 163 and 164 are closed so that liquid is trapped in the steering cylinder at the opposite sides of the piston holding the latter in adjusted position. When the hand wheel 162 is rotated in the proper direction, the slide valve may be shifted to supply liquid under pressure to one end of the steering cylinder while the other end is connected to exhaust, moving the piston 38 thereby to effect turning of the steering wheels either to the right or left as desired.

Figure 9:
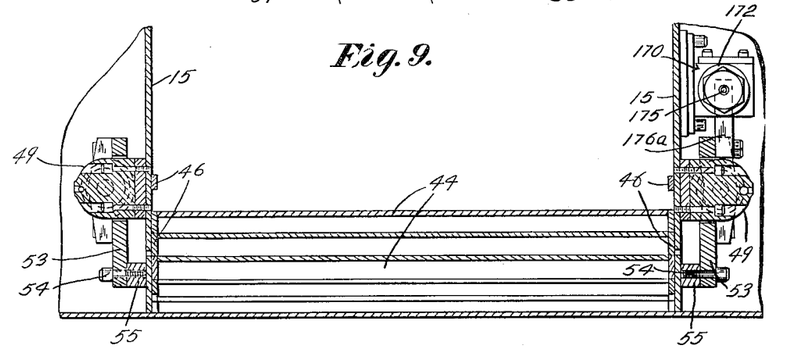
Figure 10:
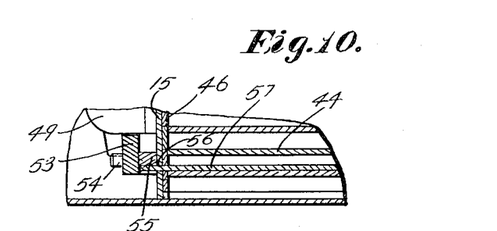
Figures 13, 14, 15, 16, 17, 18, 19:
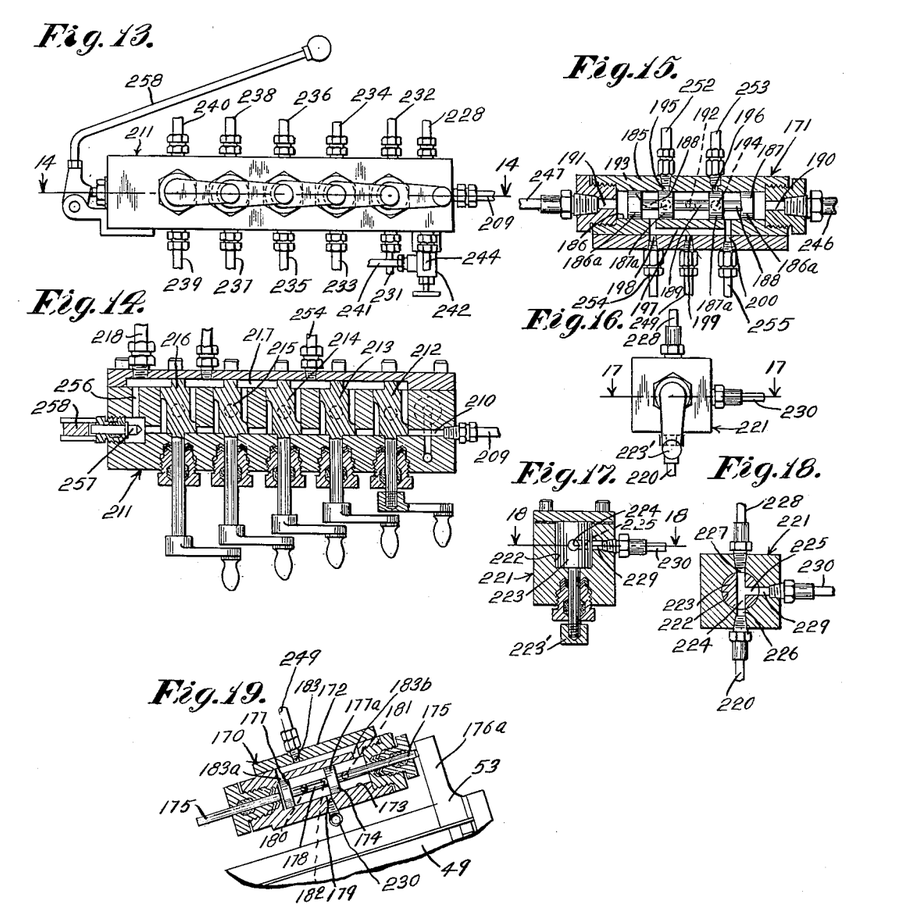
Fig. 13 is a side view of the main control valve device.
Fig. 14 is a horizontal section taken on line 14—14 of Fig. 13.
Fig. 15 is a detail section taken through the main conveyor valve.
Fig. 16 is a side view of the volume control valve.
Fig. 17 is a horizontal section taken on line 17—17 of Fig. 16.
Fig. 18 is a vertical section taken on line 18—18 of Fig. 17.
Fig. 19 is a detail sectional view taken through the automatic pilot valve of the conveyor drive control.

The control valve means for the feeder-cylinders 49 comprises an automatic pilot valve device 170 and a main conveyor valve device 171 (Fig. 15). The valve device 170 comprises a valve casing 172 having a longitudinal bore 173 arranged in parallelism with the feeder cylinders 49, as shown most clearly in Fig. 8, and secured to the adjacent side plate 15 (see also Fig. 9). Contained in the casing-bore 173 is a shiftable spool valve 174 having oppositely extending stems 175. The reciprocable feeder frame 53 has projections 176 and 176a which are alternately engageable with the valve stems 175 for shifting the valve 174 near the end of each stroke of the feeder pistons 50. The valve 174 has spaced spools 177 and 177a connected by a reduced portion 178 to provide an annular groove between the spools. A liquid supply passage 179 communicates with the valve-receiving-bore 173 midway between its ends. Also communicating with the valve-receiving-bore are passages 180, 181 and 182. A return passage 183 communicates through ports 183a and 183b with the opposite ends of the valve-receiving-bore 173. The main control valve device 171 comprises a valve casing 185 having a bore 186 containing a fluid actuated spool valve 187. This valve has end spools 186a and intermediate spools 187a and these spools are connected by reduced portions 188 and 189 to provide annular spaces between the spools. Axial end passages 190 and 191 communicate with the opposite ends of the valve-receiving-bore 186 and are connected to the passages 180 and 181 of the automatic pilot valve device 170 as later described. A passage 192 communicates with the valve-receiving-bore midway between its ends and is connected to the passage 182 of the automatic pilot valve device 170. Communicating with the valve-receiving-bore at opposite sides of the passage 192 are passages 193 and 194 communicating with the opposite ends of one of the feeder cylinders 49 and similar passages 195 and 196 communicating with the cylinder bore in the same transverse planes as the passages 193 and 194 are connected to the opposite ends of the other feeder cylinder 49. A return passage 197 communicates with the valve-receiving-bore 186 at longitudinally spaced points between the passages 193 and 194 and the ends of the bore and ports 198, 199 and 200 hereinafter referred to. When the automatic pilot valve 174 is in the position shown in Fig. 19 liquid under pressure may flow through passage 180 and passage 190 to one end of the valve-receiving-bore 186 while the opposite end of this bore is connected through passage 191 and passage 181 to exhaust, thereby to move the valve 187 to the left as viewed in Fig. 15 opening the passages 193 and 195 to supply liquid under pressure to one end of the feeder cylinders 49. When the automatic pilot valve is shifted in the opposite direction, liquid under pressure may flow from the passage 181 to the passage 191 to the opposite end of the valve-receiving-bore 186 while the other end of the bore is connected to exhaust through passage 190 and 180 to shift the valve 187 in the opposite direction thereby opening passage 193 and 195 to supply liquid to the opposite ends of the feeder cylinders 49.

Now referring to the hydraulic fluid system shown diagrammatically in Fig. 21, it will be noted that the pumping means 13 driven by the motor 12 is of the dual capacity type comprising a large capacity pump unit 205 and a small capacity pump unit 206. The suction side of the larger pump unit 205 is connected by a conduit 207 with a liquid reservoir or tank 208, the latter herein arranged on the vehicle body beneath the pumping means 13 and carrying the motor 12, as shown in Fig. 2. The discharge side of the larger pumping unit 205 is connected by the conduit 209 to a longitudinal pressure passage 210 of a main valve box 211. This valve box is conveniently arranged at the operator's station and has parallel horizontal bores containing rotary control valves 212, 213, 214, 215 and 216, respectively, each having a suitable control handle (Figs. 13 and 14). One end of the bores communicates with the pressure passage 210 and the opposite ends communicate with a parallel exhaust passage 217 connected by a return conduit 218 back to the tank 208. The valves are of a conventional design and each has oppositely extending longitudinal passages on its periphery in communication with the pressure passage and exhaust passage respectively. The suction side of the small capacity pump unit 206 is connected by conduit 219 with the tank and the discharge side of this pump unit is connected by conduit 220 with a volume control valve device 221. This valve device, as shown in Figs. 16, 17 and 18, has a bore 222 containing a rotary control valve 223 provided with a stem carrying a handle 223'. The valve 223 is traversed by a diametric passage 224 and communicating centrally with this passage is a right angle passage 225, as shown in Fig. 18. A passage 226 in the valve casing is connected to the conduit 220 and a diametrically opposite passage 227 in the valve casing is connected by a conduit 228 to the pressure passage 210 of the main valve box. A right angle passage 229 in the valve casing is connected by a conduit 230 with the inlet passage 179 of the automatic pilot valve device 170 (Fig. 19). The volume control valve 223 may be manually positioned to start or stop the conveyor or feeder 9 at the hopper bottom and to regulate the pressure volume as desired. The bore containing the valve 212 is connected by conduits 231 and 232 to the passages 127 and 133 (Fig. 5) of the bucket actuating mechanism. The bore containing the valve 213 is connected by conduits 233 and 234, respectively, with the passage 128 (Fig. 5) and with the conduit 231. Thus, by properly positioning the valves 212 and 213 the operating cylinder 101 may be operated to feed the bucket support 85 forwardly, then to open the bucket jaws, to feed the open bucket forwardly to cause the jaws to penetrate the material to be loaded, thereafter to close the bucket jaws to grasp the material and finally to retract the closed bucket to move the material rearwardly within the hopper where it is received by the bottom conveyor 9. The bore containing the valve 214 is connected by conduits 235 and 236, and branch conduits 235a and 236a with the opposite sides of the driving motors 19 for the traction wheels 3. The bore containing the valve 215 is connected by conduits 237 and 238 and branch conduits 237a and 238a to the opposite ends of the jacks 22 for raising and lowering the apron 17 with respect to the ground surface. The bore containing the valve 216 is connected by conduits 239 and 240 and branch conduits 239a and 240a with the opposite ends of the swing cylinders 75 for the end-gate 6. A conduit 241 leads from the main valve box 211 to the reel driving motor 21, and a manual control valve 242 serves to control the flow of liquid under pressure from the pressure passage of the valve box to this motor in any appropriate manner. A return conduit 243 leads from the discharge side of the reel driving motor 21 back to the tank 208. Thus, as the machine is advanced, the conductor cable may be pulled off from the reel and as the machine is reversed and travels backwards the motor 21 may drive the reel to wind in the conductor cable, all in a well-known manner. A conduit 244 leads from the pressure passage of the valve box to the passage 167 (Fig. 20) of the control valve device for the steering cylinder 39 and a return conduit 245 leads from the exhaust passage 168 of this control valve device to the return line 218 leading back to the tank. The passages 180 and 181 of the automatic pilot valve device 170 are respectively connected by conduits 246 and 247 to the passages 190 and 191 of the main control valve device 171 while the passage 182 of the pilot valve device is connected by a conduit 248 to the passage 192 of the main control valve device. The return passage 183 of the pilot valve device is conducted by a conduit 249 to the return passage 199 of the main control valve device. The passages 193 and 194 of the main control valve device are connected by conduits 250 and 251 to the opposite ends of one of the feeder cylinders 49 while the passages 195 and 196 of the main control valve device are connected by conduits 252 and 253 to the opposite ends of the other feeder cylinder 49. The return passages 198 and 200 of the main control valve device are connected by conduits 254 and 255 respectively, to the exhaust passage 217 of the valve box 211 and to the return conduit 218 leading back to the tank. As shown in Fig. 14, a by-pass passage 256 controlled by a valve 257 operated by a hand lever 258 serves to control the by-passing of liquid from the pressure passage 210 of the main valve box to the exhaust passage 217, and when any of the valves 212 to 216 inclusive, is positioned to effect flow of liquid under pressure to the device controlled thereby, the valve 257 may be closed to interrupt communication of the pressure passage with the discharge passage. When the valves are closed, the by-pass valve 257 is, of course, open.

While the manual control valve devices are disclosed grouped at the operator's station, evidently, when it may be found desirable, similar control devices may be located at both ends of the vehicle, or even at all four corners, thereby to facilitate control of the various operations of the machine.

Figure 1:
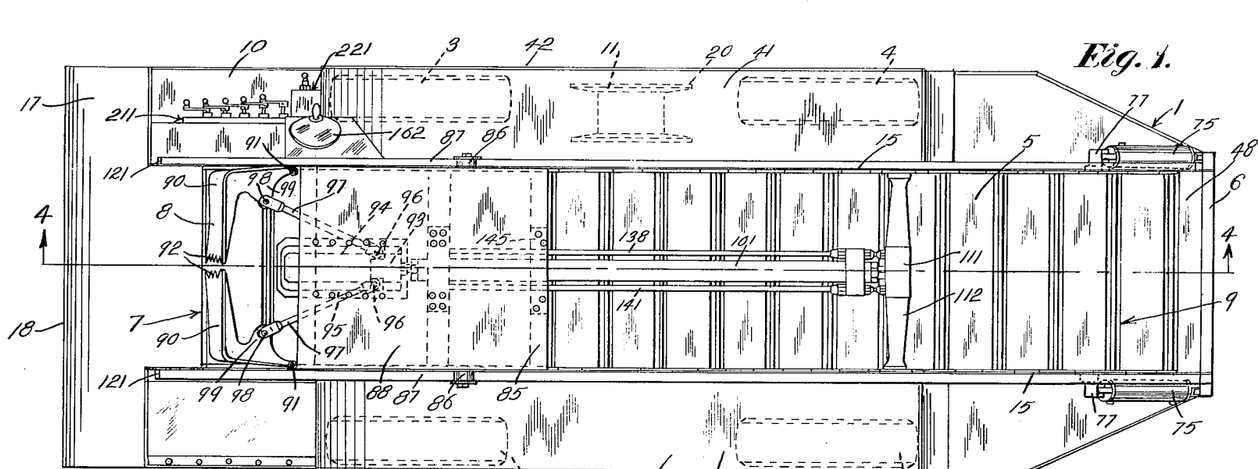
Fig. 1 is a plan view of a shuttle-loader constructed in accordance with a preferred illustrative embodiment of the invention.

The general mode of operation of the improved shuttleloader is as follows: The machine may be propelled in either direction about a mine or tunnel passageways by the traction wheels 3 driven by the reversible hydraulic motors 19, and may be steered by the steering wheels 4 operated by the steering cylinder 39. When the working place is reached and it is desired to effect loading of the vehicle compartment or hopper 5, the jacks 22 may be operated under the control of the valve 215 to tilt the vehicle body downwardly to lower the apron 17 into a position near to or onto the ground or floor surface, and liquid may be trapped in the jacks under the control of the valve 215 to hold the apron in adjusted position. By proper manipulation of the valves 212 and 213 liquid under pressure may be supplied to the feed cylinder 101 to move the bucket support 85 forwardly between the sides of the hopper to bring the pivots of the bucket jaws in advance of the vertical sides of the hopper, and the bucket jaws may then be swung apart by the piston 103 under the control of the valve 213 into wide open position as indicated in dotted lines at A in Fig. 12. The open jaws of the bucket may then be thrust forwardly by the cylinder 101 into the pile of material to be loaded until they assume the position shown at B in Fig. 12, the piston 103 may then be retracted in the cylinder to effect swinging of the bucket jaws to closed position, as shown in full lines at C in Fig. 12, thereby to grasp the material, and finally the cylinder 101 may be operated to retract the closed bucket to move the material into the hopper of the vehicle body, to the position indicated in dotted lines at D in Fig. 12. These loading operations are repeated, together with any necessary advancing and repositioning the machine from time to time, until the hopper is fully loaded. As the material is moved into the hopper by the bucket, the bottom conveyor or feeder 9 may be operated under the control of the volume control valve device 221 to move the material upwardly and rearwardly, and, since the rear end of the hopper is closed by the end-gate 6, the hopper may be completely filled with material. The loaded vehicle may then be trammed along the mine or tunnel passageways by the traction wheels to a suitable point of delivery remote from the working face, and the discharge end of the vehicle may be brought up to its proper discharging position. The valve 216 may then be positioned to effect supply of liquid under pressure to the swing cylinders 75 for the end-gate 6 to swing the latter upwardly into its open position and the latches 62 automatically connect the rear conveyor section to the main conveyor section to effect discharge of the hopper contents through the open discharge end of the hopper completely to unload the latter. The cylinder 101 may then be completely retracted to bring the closed bucket back in between the sides of the hopper, as shown in Figs. 1 and 2, so that any material which might be retained within the bucket may be moved back onto the conveyor. After the vehicle is unloaded, the end-gate 6 is again closed, throwing out the rear feed section of the conveyor, and the empty vehicle may then be trammed through the mine or tunnel passageways back to the initial working place whereby loading may be again effected.

As a result of this invention an improved material haulage vehicle is provided which is relatively rapid and efficient in operation, and which embodies a material-receiving-compartment of relatively large capacity. The improved shuttle-loader, by the provision of a power actuated bucket for loading loose material into the hopper of the vehicle, may not only be rapidly loaded but also the need of a separate loading machine and its operator are eliminated. The improved reciprocatory bottom conveyor or feeder together with the end-gate enables complete filling of the hopper of the vehicle body and enables rapid discharge of the material from the hopper. The improved shuttle-loader is readily maneuverable and is simple and rugged in design, well adapted for use in underground mining or tunnel work. These and other advantages of the invention will be clearly apparent to those skilled in the art.

While there is in this application specifically described one form which the invention may assume in practice, it will be understood that this form of the same is shown for purposes of illustration, and that the invention may be modified and embodied in various other forms without departing from its spirit or the scope of the appended claims.

What I claim as new and desire to secure by Letters Patent is:

1. A material haulage vehicle comprising a mobile body having a material-receiving-compartment extending lengthwise thereof, said compartment having vertical sidewalls, and loading means for the vehicle including a loading mechanism disposed within said compartment and movable longitudinally forwardly from said compartment to effect penetration and gathering of the material to be loaded and movable rearwardly into said compartment to effect loading of the material so gathered into said compartment, and means for operating said loading mechanism to effect aforesaid movements thereof, said loading mechanism having a support guided between said vertical sidewalls within said compartment and material penetrating and gathering elements pivoted to swing horizontally at the sides of said support and movable between open and closed positions relative to said support, and said elements cooperating with said sidewalls of said compartment as said support moves rearwardly in said compartment, said compartment sidewalls maintaining said elements in closed position during such rearward movement of said loading mechanism.

2. A material haulage vehicle comprising a mobile body having a material-receiving-compartment extending lengthwise thereof and having vertical sidewalls, and loading mechanism for the vehicle comprising a bucket having a support movable longitudinally within said compartment and pivoted laterally swingable material penetrating and gathering jaws carried by said support and movable between open and closed positions, said bucket when said jaws are in retracted closed gathering position disposable entirely within said compartment and movable longitudinally forwardly beyond said compartment into open position to effect gathering and loading of material, and means for moving said bucket-support and for swinging said jaws laterally in opposite directions about their pivots, said compartment sidewalls cooperating with said jaws to maintain the latter closed during retraction thereof in said compartment, said support, when said jaws are in advanced position, projecting forwardly from the front end of said compartment.

3. A material haulage vehicle comprising a mobile body having a material-receiving-compartment, said compartment having parallel vertical sidewalls extending lengthwise of said body, a bucket support arranged and guided between said sidewalls at the forward end of said compartment, bucket jaws pivotally mounted at the sides of said support beyond the forward end of said compartment to swing laterally toward and from one another about upright axes between open and closed positions, mechanism connected to said bucket support for moving the latter longitudinally back and forth within said compartment, and associated mechanism for swinging said jaws back and forth about their pivots to open and close said bucket, said support-moving-mechanism effecting forward movement of said support, when said jaws are wide open, to thrust said jaws into the material to be loaded, said jaws when closed moving rearwardly between the sidewalls of said compartment within the latter, said compartment sidewalls maintaining said jaws in closed position during retraction of said bucket within said compartment.

4. A material haulage vehicle comprising a mobile body having a material-receiving-compartment, said compartment having parallel vertical sidewalls extending lengthwise of said body, a bucket support arranged between said sidewalls at the forward end of said compartment, bucket jaws pivotally mounted at the sides of said support beyond the forward end of said compartment to swing laterally toward and from one another about upright, axes, mechanism connected to said bucket support for moving the latter longitudinally back and forth within said compartment, and associated mechanism for swinging said jaws back and forth about their pivots to open and close the jaws of said bucket, said support-moving-mechanism effecting forward movement of said support, when said jaws are wide open, to thrust said jaws into the material to be loaded, said jaws when closed moving rearwardly between the sidewalls of said compartment within the latter, said support-moving and jaw-swinging mechanisms comprising fluid actuated cylinder and piston means extending lengthwise of said vehicle body midway between the sides of the latter at the upper portion of said compartment.

5. A material haulage vehicle comprising a mobile body having a material-receiving-compartment, said compartment having parallel vertical sidewalls extending lengthwise of said body, a bucket support arranged between said sidewalls at the forward end of said compartment, bucket jaws pivotally mounted at the sides of said support beyond the forward end of said compartment to swing laterally toward and from one another about upright axes, mechanism connected to said bucket support for moving the latter longitudinally back and forth within said compartment, associated mechanism for swinging said jaws back and forth about their pivots to open and close the jaws of said bucket, said support-moving-mechanism effecting forward movement of said support, when said jaws are wide open, to thrust said jaws into the material to be loaded, said jaws when closed moving rearwardly between the sidewalls of said compartment within the latter, said bucket support having supporting rollers near the top thereof, and trackways at the tops of said sidewalls of said compartment and along which said rollers travel during longitudinal movement of said bucket support.

6. A material haulage vehicle comprising a mobile body having a longitudinally extending material-receiving-compartment, said body having an adjustable apron at its forward end movable toward and from the ground surface over which the vehicle is adapted to travel, means for tilting said body to effect raising and lowering of said apron, a reciprocable loading mechanism for the vehicle mounted at the forward end of said body and cooperating with said apron, when the latter is in lowered position, to effect loading of loose material from the ground surface over said apron into said compartment, said reciprocable loading mechanism including cooperating loading elements reciprocable longitudinally and swingable laterally relative to said apron into material penetrating and gathering positions, said elements when said loading mechanism is moved rearwardly during its rearward stroke moving over said apron within said compartment, and means effective as said loading mechanism moves rearwardly within said compartment for elevating said loading elements, when the latter are in gathering position, to clear said apron.

7. A material haulage vehicle as set forth in claim 6 wherein said elevating means includes mounting means for said loading mechanism on said body and which is movable relative to said body to effect elevation of said loading mechanism with respect to said apron whereby, when said loading mechanism is advanced with respect to said body during its forward stroke, said loading elements automatically assume their lowered operating position with respect to said apron above the latter.

8. A material haulage vehicle as set forth in claim 7 wherein said loading elements of said loading mechanism, when the latter is in an advanced lowered position relative to said body and said elements are moved laterally, have their lower edges disposed in adjacency to the top surface of said apron.

9. A material haulage vehicle comprising a mobile body having a material-receiving-compartment extending lengthwise thereof, said compartment having vertical sidewalls, a bucket mounted at the forward end of said body for effecting loading of said compartment and having pivoted laterally swingable jaws movable between open and closed positions for gathering loose material and for moving such material into said compartment, and mechanism for actuating said bucket and for swinging said jaws about their pivots including means for effecting forward movement of said bucket with its jaws in open position to thrust said jaws into the loose material and for retracting said jaws when closed into said compartment, said compartment sidewalls cooperating with said jaws during retraction thereof within said compartment for maintaining said jaws closed during such retraction.

10. A material haulage vehicle as set forth in claim 9 wherein said mechanism for actuating said bucket and for swinging said jaws includes power actuated connections arranged longitudinally between said compartment sidewalls and engaging said jaws for swinging the latter about their pivots into their open and closed positions.

11. A material haulage vehicle comprising a mobile body having a material-receiving-compartment extending lengthwise thereof, a bucket mounted at the forward end of said body for effecting loading of said compartment and having laterally swingable jaws for gathering loose material and for moving such material into said compartment, and mechanism for guiding said bucket and for swinging said jaws about their pivots to open and close said jaws including means for effecting forward movement of said bucket with its jaws in open position to thrust said jaws into the loose material and for retracting said bucket when said jaws are closed into said compartment, said mechanism for guiding said bucket and for swinging said jaws including a longitudinally extending fluid cylinder, a piston contained in said cylinder, and means for controlling the flow of pressure fluid with respect to said cylinder.

12. A material haulage vehicle comprising a mobile body having a material-receiving-compartment extending lengthwise thereof, a bucket mounted at the forward end of said body for effecting loading of said compartment and having pivoted jaws for gathering loose material and for moving such material into said compartment, and mechanism for actuating said bucket and for swinging said jaws about their pivots including means for effecting forward movement of said bucket with its jaws in open position to thrust said jaws into the loose material, said mechanism including power actuated connections engaging said jaws for swinging the latter about their pivots into their open and closed positions while said bucket remains bodily stationary, said connections including a longitudinally extending fluid cylinder, a piston contained in said cylinder and means for controlling the flow of pressure fluid with respect to said cylinder and connections between said piston and said jaws whereby the latter, as said piston is moved relative to said cyinder under the influence of pressure fluid, are swung about their pivots.

13. A material haulage vehicle as set forth in claim 12 wherein a second stationary piston is contained in said cylinder whereby said cylinder may be moved axially upon fluid flow thereto to effect back and forth movement of said bucket bodily relative to said vehicle body.

14. A material haulage vehicle comprising a mobile body having motor actuated propelling and steering means, said body having a material-receiving-compartment extending lengthwise thereof, motor actuated conveying means at the bottom of said compartment and movable relative to said body for moving loose material in said compartment lengthwise thereof, motor actuated loading means mounted on said body and movable forwardly and rearwardly relative to the latter for moving loose material into said compartment, a motor actuated closure means for the discharge end of said compartment, said conveying means having a movable discharge portion associated with said closure means and whose movement is adapted to be interrupted while the remaining portion of said conveying means continues to operate, a source of power medium on said body, and control means for separately controlling the supply of power medium with respect to said several motor actuated means, said control means including means for controlling movement of said closure means into and out of its closed position, and means actuated by said closure means for controlling operation of said discharge portion of said conveying means whereby said discharge portion is rendered inoperative when said closure means assumes its closed position.

15. A material haulage vehicle comprising a mobile body having a material-receiving-compartment extending lengthwise thereof and provided with sidewalls, a bucket mounted at one end of said body for effecting gathering of material on the floor and for moving the material so gathered into said compartment, said bucket comprising a support of inverted U-shape, open at its bottom, guided between said sidewalls within said compartment and pivoted laterally swingable jaws carried by said support, and mechanism for moving said bucket-support bodily outwardly and inwardly relative to said body and for swinging said jaws laterally about their pivots relative to said support including means for effecting outward bodily movement of said bucket with the jaws in wide open position to thrust said jaws into the loose material, said jaws upon inward retracting movement thereof when closed moving inwardly into said compartment with said support, said compartment sidewalls cooperating with said closed jaws in maintaining the latter in closed position during retraction of said support in said compartment.

16. A self-loading vehicle comprising a body having supporting and propelling means, said body having a material-receiving compartment extending lengthwise thereof, a bucket mounted at one end of said body for effecting gathering of loose material on the floor and for moving the material so gathered into said compartment, said bucket having a support movable longitudinally within said compartment and guided at the sides of said compartment and horizontally swingable digging jaws pivotally mounted at the sides of said support and, when closed, movable with said support within said compartment, and power operated mechanism operatively connected to said support for bodily thrusting said bucket outwardly longitudinally relative to said body into the loose material and for bodily retracting said bucket when filled with material rearwardly longitudinally relative to said body to move the material into said compartment.

17. In a shuttle-loader, an elongated body having supporting and propelling means and adapted to travel over a floor surface, said body being open at one end and having a bottom and sidewalls, a bucket mounted at said end of said body comprising a support within said compartment between said sidewalls and having an open bottom, and gathering jaws pivoted for horizontal swinging movement at the sides of said support, and swingable between open and closed positions relative to said support, means for bodily moving said bucket-support outwardly longitudinally relative to said body to thrust said gathering jaws, when open, into the loose material on the floor surface and bodily to retract said gathering jaws, when closed, with the material so gathered inwardly longitudinally relative to said body and to move the material into said body, said gathering jaws during retraction of said bucket moving between said sidewalls of said body, said sidewalls of said compartment guiding said jaws as the latter are retracted relative to said body.

18. A shuttle-loader as set forth in claim 17 wherein means is provided for raising and lowering said bucket-support relative to said body between a position at or near the floor level to an elevated position above the floor, said raising and lowering means effecting raising of said gathering jaws as said bucket moves rearwardly in said compartment.

19. In a shuttle-loader, an elongated body having supporting and propelling means and adapted to travel over a floor surface, said body being open at one end and having a bottom and sidewalls, a bucket mounted at said end of said body, means for bodily moving said bucket outwardly longitudinally relative to said body to thrust said bucket into the loose material on the floor surface and bodily to retract the bucket with the material so gathered inwardly longitudinally relative to said body and to dump the material into said body, said bucket during its retraction moving between said sidewalls of said body, said sidewalls of said compartment guiding said bucket as the latter is retracted relative to said body, said bucket comprising cooperating laterally swingable jaws which when closed are movable between said sidewalls of said body, said jaws being swingable wide apart beyond said end of said body as said bucket is thrust forwardly.

20. A material haulage vehicle comprising a body having supporting and propelling means and adapted to travel over the floor of a mine, said body having a material-receiving compartment extending longitudinally thereof and provided with sidewalls, said body at one end adjustable in vertical planes and having an apron rigid with respect thereto and adjustable therewith, a loading mechanism mounted at said end of said body and movable relative to and cooperating with said apron, when the latter is in lowered position, to effect loading of loose material from the floor over said apron into said compartment, the sidewalls of said compartment cooperating with said loading mechanism for guiding the latter during its retraction within said compartment, and means effective as said loading mechanism is advanced relative to said body for lowering said mechanism into loading position with respect to said apron, said lowering means also being effective to raise said loading mechanism relative to said apron as the material is moved rearwardly by said mechanism into said compartment.

21. A material haulage vehicle comprising a body having supporting and propelling means and adapted to travel over a mine floor, said body having a material-receiving compartment extending lengthwise thereof, and conveying means extending along the bottom of said compartment for moving material into said compartment during loading and for discharging material from said compartment during unloading, said conveying means having a discharge portion, and a releasable connection for said discharge portion for disconnecting the latter from the remaining portion of said conveying means whereby said discharge portion is inoperative during loading of said compartment and automatically effective when unloading is effected to connect said discharge portion of said conveying means for actuation by said remaining portion to discharge the material.

22. A material haulage vehicle comprising a mobile body having a material-receiving compartment extending lengthwise thereof, and loading means for the vehicle including a loading mechanism disposed within said compartment and movable longitudinally forwardly in said compartment into a position wherein said mechanism projects forwardly from said compartment to effect penetration and gathering of the material to be loaded, said loading mechanism movable rearwardly in said compartment to effect loading of the material so gathered into said compartment, means for operating said loading mechanism to effect aforesaid movements thereof, and means operatively associated with said mechanism for automatically elevating the latter in said compartment relative to the compartment-bottom as the result of rearward movement of said loading mechanism in said compartment by said operating means.

23. A vehicle as set forth in claim 22 wherein said elevating means comprises guiding means on said body having an upwardly and rearwardly inclined guide surface and a guide carried by said loading mechanism and moving along said guide surface, said guide as it moves upwardly along said inclined guide surface during rearward movement of said loading mechanism effecting elevation of said loading mechanism as aforesaid.

24. A vehicle as set forth in claim 22 wherein said operating means for said loading mechanism includes elements for moving said loading mechanism forwardly and rearwardly as aforesaid and pivoted to tilt in vertical planes as said loading mechanism is elevated as aforesaid.

25. A vehicle as set forth in claim 24 wherein said elements of said operating means comprise power operated extensible means having pivotal mounting means.

26. A vehicle as set forth in claim 25 wherein said elements of said power operated extensible means comprise a fluid cylinder containing a reciprocable piston and said pivotal mounting means includes a pivot at the rear end of said cylinder for pivoting the latter on said vehicle-body.

27. A material haulage vehicle comprising a mobile body having a material-receiving compartment extending lengthwise thereof, a loading means for the vehicle including a loading mechanism disposed within said compartment and movable longitudinally forwardly from said compartment to effect penetration and gathering of the material to be loaded and movable rearwardly in said compartment to effect loading of the material so gathered into said compartment, and means for operating said loading mechanism to effect aforesaid movements thereof, said loading mechanism comprising a frame having a flat top and vertical sides and said compartment having vertical sidewalls between which said frame is movable with the sidewalls of said compartment cooperating with the sides of said frame for guiding said loading mechanism as it moves forwardly and rearwardly as aforesaid, said operating means being operatively connected to said frame for moving the latter back and forth, said loading mechanism including material penetrating and gathering jaws pivotally mounted at the front end of said frame at the sides thereof and swingable horizontally beyond the sides of said frame when the latter is in its forward position in said compartment with said jaws located outside of said compartment, said jaws being disposed within the sides of said frame when the latter is moved rearwardly.

28. A vehicle as set forth in claim 27 wherein said jaws when closed have vertical sides parallel with the sides of said frame, said compartment sidewalls also guiding said jaws and maintaining the latter closed as they move rearwardly with said frame in said compartment.

29. A material haulage vehicle comprising a mobile body having a material-receiving compartment extending lengthwise thereof, a loading means for the vehicle including a loading mechanism disposed within said compartment and movable longitudinally forwardly from said compartment to effect penetration and gathering of the material to be loaded and movable rearwardly in said compartment to effect loading of the material so gathered into said compartment, said loading mechanism comprising a frame having a flat top and vertical sides and said compartment having vertical sidewalls between which said frame is movable, said loading mechanism also including material penetrating and gathering jaws pivotally mounted at the front end of said frame at the sides thereof and swingable horizontally beyond the sides of said frame when the latter is in its forward position in said compartment with said jaws located outside of said compartment, said jaws when closed having vertical sides parallel with the sides of said frame, said compartment sidewalls guiding said jaws and maintaining the latter closed as they move rearwardly with said frame in said compartment, and means for operating said loading mechanism to effect aforesaid movements thereof, said sidewalls of said compartment cooperating with the sides of said frame for guiding said loading mechanism as it moves forwardly and rearwardly as aforesaid, said operating means being operatively connected to said frame for moving the latter back and forth and including an element operatively associated with said jaws for swinging the latter about their pivots.

References Cited in the file of this patent

UNITED STATES PATENTS

| Number | Name | Date |
|---|---|---|
| 1,307,009 | Joy | June 17, 1919 |
| 1,908,967 | FitzSimons | May 16, 1933 |
| 1,919,199 | Camerota | July 25, 1933 |
| 2,099,981 | Joy | Nov. 23, 1937 |
| 2,113,760 | Joy | Apr. 12, 1938 |
| 2,139,162 | Jenkins | Dec. 6, 1938 |
| 2,298,448 | Arentzen | Oct. 13, 1942 |
| 2,299,368 | Wood | Oct. 20, 1942 |
| 2,338,160 | Arentzen | Jan. 4, 1944 |
| 2,356,434 | Russell | Aug. 22, 1944 |
| 2,375,063 | Andershock | May 1, 1945 |
| 2,394,006 | Osgood | Feb. 5, 1946 |
| 2,420,009 | Osgood | May 6, 1947 |
| 2,439,001 | Hippard | Apr. 6, 1948 |
| 2,487,729 | Richardson | Nov. 8, 1949 |
| 2,494,013 | Tapp | Jan. 10, 1950 |